United States Patent
Choi et al.

(10) Patent No.: US 9,780,565 B2
(45) Date of Patent: Oct. 3, 2017

(54) SYSTEM AND METHOD FOR CONTROLLING FREQUENCY

(71) Applicant: SK INNOVATION CO., LTD., Seoul (KR)

(72) Inventors: Jin Young Choi, Seoul (KR); Eun Sung Park, Daejeon (KR)

(73) Assignee: SK INNOVATION CO., LTD., Seoul (KR)

(*) Notice: Subject to any disclaimer, the term of this patent is extended or adjusted under 35 U.S.C. 154(b) by 527 days.

(21) Appl. No.: 14/383,339

(22) PCT Filed: Mar. 5, 2013

(86) PCT No.: PCT/KR2013/001733
§ 371 (c)(1),
(2) Date: Sep. 5, 2014

(87) PCT Pub. No.: WO2013/133592
PCT Pub. Date: Sep. 12, 2013

(65) Prior Publication Data
US 2015/0015069 A1    Jan. 15, 2015

(30) Foreign Application Priority Data
Mar. 8, 2012 (KR) .................. 10-2012-0023693

(51) Int. Cl.
*H02J 1/10* (2006.01)
*H02J 3/38* (2006.01)
(Continued)

(52) U.S. Cl.
CPC ............. *H02J 3/32* (2013.01); *H02H 7/06* (2013.01); *H02J 3/381* (2013.01); *H02J 7/0068* (2013.01);
(Continued)

(58) Field of Classification Search
CPC ........ H02J 7/00; H02J 7/02; H02J 7/06; H02J 3/28; H02J 3/02; H02J 3/26; H02J 3/00;
(Continued)

(56) References Cited

U.S. PATENT DOCUMENTS 5,847,943 A * 12/1998 Vogel ............... H02P 21/22
                                                  363/34
5,954,820 A *  9/1999 Hetzler ............. G06F 1/3203
                                                  713/323
(Continued)

FOREIGN PATENT DOCUMENTS

JP     2009-141993     6/2009
JP     2010-233353    10/2010
(Continued)

OTHER PUBLICATIONS

International Search Report for corresponding International Application No. PCT/KR13/001733.

*Primary Examiner* — Fritz M Fleming
*Assistant Examiner* — Jagdeep Dhillon
(74) *Attorney, Agent, or Firm* — Hauptman Ham, LLP

(57) ABSTRACT

Provided are a system and a method for controlling a frequency. The system for controlling the frequency includes: at least one power supplying unit generating power; at least one systematic unit consuming the power generated from the power supplying unit; at least one standby power unit storing the power generated from the power supplying unit and including at least one storage device; and at least one grid unit connecting the power supplying unit, the systematic unit, and the standby power unit to one another and controlling a frequency of the systematic unit.

11 Claims, 3 Drawing Sheets

(51) Int. Cl.
*H02J 9/00* (2006.01)
*H02J 3/32* (2006.01)
*H02H 7/06* (2006.01)
*H02J 7/00* (2006.01)

(52) U.S. Cl.
CPC ..... *H02J 2007/005* (2013.01); *Y10T 307/344* (2015.04)

(58) Field of Classification Search
CPC ... H02P 9/00; H02P 9/10; H02M 5/45; H02M 5/48; H02M 5/00
USPC ........ 307/23, 64, 66, 68, 84, 72–76; 363/37, 363/34, 35; 320/128, 132, 130; 290/1 R, 290/7
See application file for complete search history.

(56) References Cited

U.S. PATENT DOCUMENTS

| | | | |
|---|---|---|---|
| 6,239,513 B1 * | 5/2001 | Dean | H02J 9/066 307/64 |
| 6,603,672 B1 * | 8/2003 | Deng | H02J 7/345 363/37 |
| 7,652,394 B2 | 1/2010 | Hirst | |
| 7,839,027 B2 | 11/2010 | Shelton et al. | |
| 2005/0077881 A1 * | 4/2005 | Capp | H02J 3/30 322/29 |
| 2007/0177319 A1 | 8/2007 | Hirst | |
| 2010/0042857 A1 * | 2/2010 | Zommer | G06F 1/3203 713/320 |
| 2010/0090532 A1 | 4/2010 | Shelton et al. | |
| 2011/0078092 A1 * | 3/2011 | Kim | B60L 11/1824 705/412 |
| 2011/0285147 A1 * | 11/2011 | Fyke | H02J 3/28 290/1 R |
| 2012/0086404 A1 * | 4/2012 | Lim | H02J 3/28 320/128 |
| 2012/0094151 A1 * | 4/2012 | Kim | H02J 7/00 429/50 |
| 2012/0200264 A1 * | 8/2012 | Choi | H02J 3/32 320/132 |

FOREIGN PATENT DOCUMENTS

| | | |
|---|---|---|
| KR | 10-2010-0105435 | 9/2010 |
| KR | 10-2012-0012532 | 2/2012 |

* cited by examiner

SYSTEM AND METHOD FOR CONTROLLING FREQUENCY

TECHNICAL FIELD

The present invention relates to a system and a method for controlling a frequency, and more particularly, to a system and a method for controlling a frequency capable of increasing quality of power by performing charging and discharging to maintain a constant frequency using a standby power unit.

BACKGROUND ART

Test sites of a smart grid have been recently developed and have been test-operated. A concept of storing power among concepts of the smart grid is one of the most important concepts, and quality of intermittent and unstable power created by new renewable energy should be improved and power produced by the improved quality may be needed to be fluidly used. However, in order to build up the above-mentioned facility, it is inevitable that a new mass infrastructure is constructed.

The present invention relates to a system for controlling a frequency capable of storing power produced by electricity generation in a storage device and then appropriately providing and consuming the power using a state of charge of stored power in the storage device, in order to improve quality of the produced power and fluidly use the produced power.

Korean Patent Laid-Open Publication No. 2011-0070654 (entitled "Apparatus and Method for Smart Energy Management by Controlling Power Consumption", hereinafter, referred to as Related Art 1) discloses a structure capable of supplying energy according to demands of a customer using a current facility by remotely collecting energy consumption and analyzing energy consumption pattern in a smart grid field without additionally installing an energy producing and supplying facility according to an continuous increase in energy consumption. However, since the related art 1 analyzes the energy consumption pattern for a predetermined time and supplies energy according to the pattern, it does not use produced power to thereby have degraded energy efficiency.

PATENT DOCUMENT

Korean Patent Laid-Open Publication No. 10-2011-0070654 (published on Jun. 24, 2011)

DISCLOSURE

Technical Problem

An object of the present invention is to provide a system for controlling a frequency capable of maintaining a constant frequency by setting a use order according to a state of charge of the respective storage devices to perform charging and discharging necessary to the respective storage devices in providing power of high quality by minimizing frequency variation according to variation in a load amount.

Technical Solution

In one general aspect, a system for controlling a frequency includes: at least one power supplying unit generating power; at least one systematic unit consuming the power generated from the power supplying unit; at least one standby power unit storing the power generated from the power supplying unit and including at least one storage device; and at least one grid unit connecting the power supplying unit, the systematic unit, and the standby power unit to one another and controlling a frequency of power flowing to the systematic unit.

The standby power unit may include at least one storage device, wherein the at least one storage device may be discharged when a frequency supplied to the systematic unit is decreased below a predetermined value and may be charged when the frequency supplied to the systematic unit is increased above the predetermined value.

The standby power unit may include a controlling unit, the controlling unit determining a use priority of the storage device using a state of charge (SOC) of the storage device.

In another general aspect, a method for controlling a frequency by the system for controlling the frequency includes: an operation of calculating a first SOC calculating the respective state of charge (SOC) of the storage devices constituting the standby power unit; an operation of determining a first SOC reference determining whether an absolute value obtained by subtracting a first reference value of the SOC from the SOC of the storage device calculated in the operation of calculating the first SOC is a predetermined first reference or less; an operation of participating a storage device participating the storage device having the SOC of the storage device of the first reference or less in the operation of determining the first SOC reference in the system for controlling the frequency; an operation of determining a priority determining priorities of the storage devices participated in the operation of participating the storage device; an operation of requesting a frequency increase adjustment requesting the frequency increase adjustment by the systematic unit consuming the power generated from the power supplying unit; an operation of calculating the number of participated storage devices calculating, by the standby power unit storing the power generated from the power supplying unit and including one or more storage devices, the number of storage devices necessary to perform the frequency increase requested in the operation of requesting the frequency increase adjustment; an operation of adjusting a frequency increase increasing the frequency by applying the power stored in the storage device to the systematic unit in the case in which the storage devices as many as the necessary number calculated in the operation of calculating the storage device need to increase the frequency depending on the priority determined in the operation of determining the priority; an operation of calculating a second SOC calculating the respective SOC of the storage devices constituting the standby power unit; an operation of determining a second SOC reference determining whether an absolute value obtained by subtracting a second reference value of the SOC from the SOC of the storage device calculated in the operation of calculating the second SOC exceeds a predetermined second reference; and an operation of detaching a storage device detaching the storage device having the SOC of the storage device exceeding the second reference in the operation of determining the second SOC reference from the system for controlling the frequency.

In another general aspect, a method for controlling a frequency by the system for controlling the frequency includes: an operation of calculating a first SOC calculating the respective state of charge (SOC) of the storage devices constituting the standby power unit; an operation of determining a first SOC reference determining whether the SOC of the storage device calculated in the operation of calculating the first SOC is a predetermined first reference or less; an operation of participating a storage device participating the storage device having the SOC of the storage device of the first reference or less in the operation of determining the first SOC reference in the system for controlling the frequency; an operation of determining a priority determining priorities of the storage devices participated in the operation of participating the storage device; an operation of requesting a frequency decrease adjustment requesting the frequency decrease adjustment by the systematic unit consuming the power generated from the power supplying unit; an operation of calculating the number of participated storage devices calculating, by the standby power unit storing the power generated from the power supplying unit and including one or more storage devices, the number of storage devices necessary to perform the frequency decrease requested in the operation of requesting the frequency decrease adjustment; an operation of adjusting a frequency decrease decreasing the frequency by charging the storage device with the power generated from the power supplying unit in the case in which the storage devices as many as the necessary number calculated in the operation of calculating the storage device need to decrease the frequency depending on the priority determined in the operation of determining the priority; an operation of calculating a second SOC calculating the respective SOC of the storage devices constituting the standby power unit; an operation of determining a second SOC reference determining whether the SOC of the storage device calculated in the operation of calculating the second SOC exceeds a predetermined second reference; and an operation of detaching a storage device detaching the storage device having the SOC of the storage device exceeding the second reference in the operation of determining the second SOC reference from the system for controlling the frequency.

The first reference may be an absolute value (|SOC−first reference value|) obtained by subtracting the first reference value from the SOC of the storage device and may be between 10% and 30%.

The first reference value may be between 40% and 80%.

The second reference may be an absolute value (|SOC−second reference value|) obtained by subtracting the second reference value from the SOC of the storage device and is between 20% and 40%.

The second reference value may be between 40% and 80%.

In the case in which the storage device is added to the standby power unit, the added storage device may be performed from the operation of calculating the SOC after a predetermined reference time lapses.

The reference time may be between four seconds and thirty minutes after the storage device is added.

Advantageous Effects

The system for controlling the frequency according to the present invention having the above-mentioned configuration controls the charging and discharging of the standby power unit using the state of charge (SOC) of the respective storage devices constituting the standby power unit without adding a steam power generator for performing a frequency estimation driving, thereby making it possible to reduce cost of investment of control facility according to variation in a generator output.

In addition, it is possible to rapidly cope with a frequency change in power by using at least one storage device constituting the standby power unit as a virtual frequency controller.

BEST MODE

Figure 1:
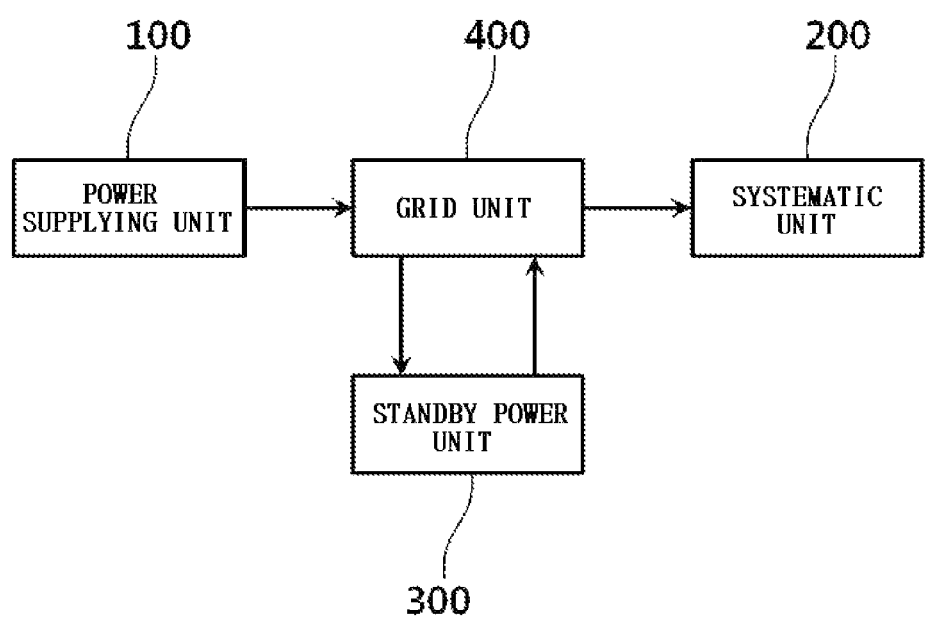
FIG. 1 is a view schematically illustrating a configuration of a system for controlling a frequency according to an exemplary embodiment of the present invention.

Hereinafter, a system and a method for controlling a frequency according to exemplary embodiments of the present invention will be described in detail with reference to the accompanying drawings. The drawings of the present invention to be described below are provided by way of example so that the idea of the present invention can be sufficiently transferred to those skilled in the art to which the present invention pertains. Therefore, the present invention is not be limited to the drawings provided below but may be modified in many different forms. In addition, like reference numerals denote like elements throughout the specification.

Technical terms and scientific terms used in the present specification have the general meaning understood by those skilled in the art to which the present invention pertains unless otherwise defined, and a description for the known function and configuration obscuring the present invention will be omitted in the following description and the accompanying drawings.

FIG. 1 is a view schematically illustrating a configuration of a system for controlling a frequency according to an exemplary embodiment of the present invention.

The system for controlling the frequency according to an exemplary embodiment of the present invention is configured to include a power supplying unit 100, a systematic unit 200, a standby power unit 300, and a grid unit 400.

The configuration of the system for controlling the frequency according to an exemplary embodiment of the present invention will be described in detail with reference to FIG. 1.

The power supplying unit 100, which is an apparatus generating and supplying power, may use a new renewable energy generation system. The new renewable energy generation system generally uses solar power, wind power, or the like as a resource in performing the generation.

The systematic unit 200 is apparatuses consuming power generated from the power supplying unit 100 and is a systematic apparatus consuming power, in which apparatuses consuming power such as an industrial apparatus, a commercial apparatus, a home apparatus, and the like are broadly distributed such as a net.

The standby power unit 300 is configured to include one or more storage devices, where the respective storage devices store power generated from the power supplying unit 100. In the case in which the frequency varies according to power consumption variation in the systematic unit 200, the power stored in the storage device of the standby power unit 300 is charged and discharged to maintain a constant frequency, thereby making it possible to maintain the corresponding frequency.

The grid unit 400 may connect the power supplying unit 100, the systematic unit 200, and the standby power unit 300 to one another and control a flow of power generated from the power supplying unit 100. That is, the power generated from the power supplying unit 100 may be consumed by applying it to the systematic unit 200 through the grid unit 400 and the power generated from the power supplying unit 100 may be stored in the standby power unit 300 through the grid unit 400. In addition, the power stored in the storage device of the standby power unit 300 may be re-transmitted to the systematic unit 200 through the grid unit 400. In this case, when the standby power unit 300 includes a plurality of storage devices, a priority may be determined to smoothly transfer the power to the systematic unit 200.

Figure 3:
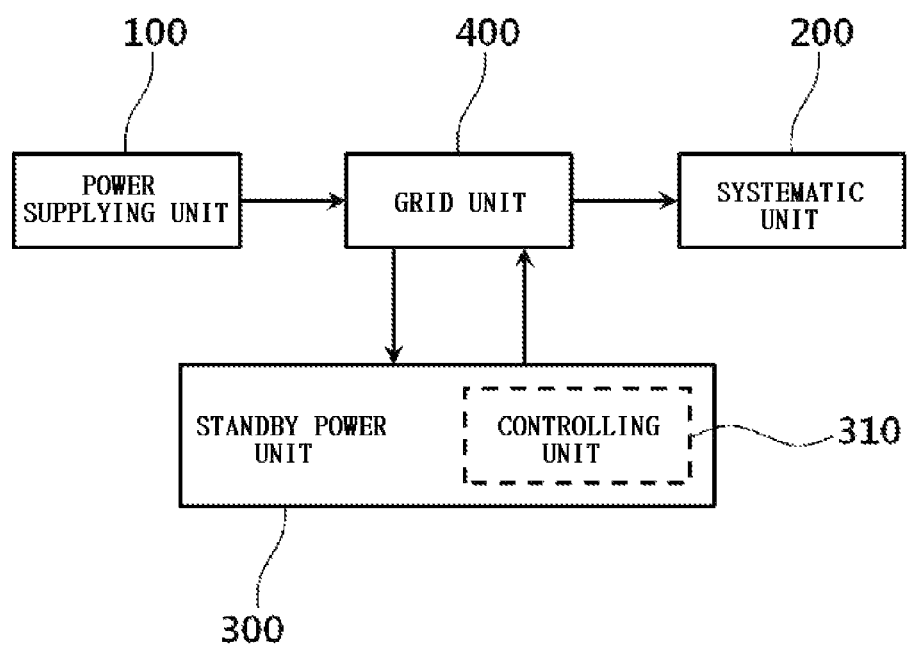
FIG. 3 is a view illustrating a configuration of a system for controlling a frequency according to an exemplary embodiment of the present invention in detail.

As illustrated in FIG. 3, the standby power unit 300 may be configured to include a controlling unit 310, where the controlling unit 310 may determine the priority of the storage devices in controlling the frequency of the systematic unit 200 using remaining capacity, that is, a state of charge (SOC) of the respective storage devices constituting the standby power unit 300. In this case, the priority may be determined in the order from 0% of a calculated value of an absolute value (|SOC−60%|) of a value obtained by subtracting 60% from the SOC of the storage device to a large calculated value of the absolute value (|SOC−60%|) of the value obtained by subtracting 60% from the SOC.

In other words, the system for controlling the frequency is an intelligent system for controlling the frequency capable of optimizing quality of the generated power by charging the standby power unit 300 with the power generated from the power supplying unit 100 in the case in which the frequency of the systematic unit 200 is high and supplying the power charged with the standby power unit 300 to the systematic unit 200 in the case in which the frequency of the systematic unit 200 is low, through a bidirectional real time information exchange with the systematic unit 200, which is a customer.

The storage devices constituting the standby power unit 300 of the system for controlling the frequency according to an exemplary embodiment of the present invention are an electric automobile and an energy storage system (ESS), where the electric automobile includes an electric vehicle (EV), a hybrid electric vehicle (HEV), a plug-in hybrid electric vehicle (PHEV), a neighborhood electric vehicle (NEV), and the like. That is, in the case in which the frequency of the systematic unit 200 is high, the standby power unit 300 is charged by a high-speed charger or a slow charger for the standby power unit 300 and in the case in which the frequency of the systematic unit 200 is low, the standby power unit 300 is discharged.

Figure 2:
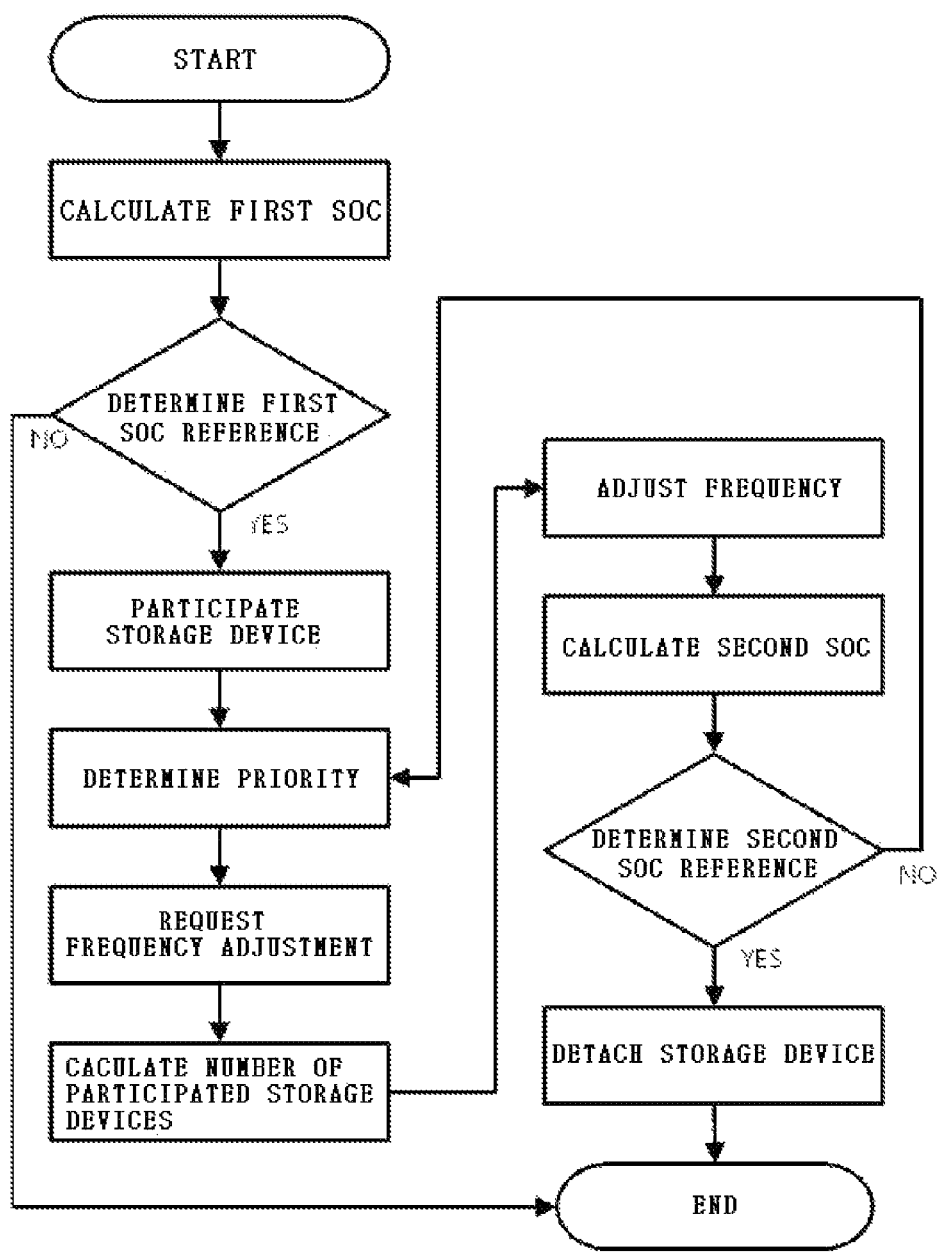
FIG. 2 is a flow chart of a method for controlling a frequency according to an exemplary embodiment of the present invention.

The method for controlling the frequency according to an exemplary embodiment of the present invention will be described in detail with reference to FIG. 2.

The method for controlling the frequency according to an exemplary embodiment of the present invention is a control method of a frequency control for controlling a frequency by calculating the respective state of charge (SOC) for storage devices of a standby power unit 300 in which power generated from a power supplying unit 100 is stored, determining a use order of the storage devices of the standby power unit 300 depending on the calculated SOC to allow the storage devices to participate, and controlling the standby power unit 300 in the case in which an additional frequency adjustment is required due to a frequency change in a systematic unit 200. The standby power unit 300 may include one or more storage devices.

The method for controlling the frequency according to an exemplary embodiment of the present invention is configured to include operation of calculating a first SOC, operation of determining a first SOC reference, operation of participating a storage device, operation of determining a priority, operation of requesting a frequency adjustment, operation of calculating the number of participated storage devices, operation of adjusting a frequency, operation of calculating a second SOC, operation of determining a second SOC reference, and operation of detaching a storage device.

In the operation of calculating the first SOC, the respective state of charge (SOC) of the storage devices constituting the standby power unit 300 is calculated.

In the operation of determining the first SOC reference, it is determined whether an absolute value obtained by subtracting a first reference value of the SOC from the SOC of the storage device calculated in the operation of calculating the first SOC is a predetermined first reference or less. In this case, the first reference is an absolute value (|SOC−first reference value|) obtained by subtracting the first reference value from the SOC of the storage device and may have a calculated value between 10% and 30%, where the first reference value may be selected between 40% and 80% and a predetermined reference may be changed by taking account of lifespan characteristics corresponding to the respective storage devices and a SOC allowable error rate of a battery management system (BMS) to the storage device. In the operation of determining the first SOC reference, when the SOC of the storage device is a predetermined reference or less, the stored power is not used for the systematic unit 200 and is maintained in the storage device. In other words, an energy storage device or an electric automobile having the SOC of the predetermined reference or less is not adopted as a frequency adjusting resource.

In the operation of participating the storage device, the storage device having the SOC of the storage device of the first reference or less in the operation of determining the first SOC reference is participated in the system for controlling the frequency.

In the operation of determining the priority, the priorities of the storage devices participated in the operation of participating the storage device are determined. In this case, if it is assumed that the first reference value is 60%, the priority may be determined in the order from 0% of a calculated value of an absolute value (|SOC−60%|) of a value obtained by subtracting 60% from the SOC of the storage device to a large calculated value of the absolute value (|SOC−60%|) of the value obtained by subtracting 60% from the SOC.

In the operation of requesting the frequency adjustment, the frequency adjustment is requested by the systematic unit 200 in which the power generated from the power supplying unit 100 is consumed.

In the operation of calculating the number of participated storage devices, the standby power unit 300 storing the power generated from the power supplying unit 100 and including one or more storage devices calculates the number of storage devices necessary to perform the frequency adjustment requested in the operation of requesting the frequency adjustment. In this case, the number of participated storage devices may be calculated as a value calculated by dividing the requested power by chargeable and dischargeable power per one storage device. In this case, the chargeable and dischargeable power may be, for example, about 3 kW, and the above-mentioned 3 kW may be changed.

In the operation of adjusting the frequency, in the case in which the storage devices as many as the necessary number calculated in the operation of calculating the storage device need to increase a frequency depending on the priority determined in the operation of determining the priority, the power stored in the storage device is applied to the systematic unit 200, thereby increasing the frequency, and in the case in which the storage devices need to decrease the frequency, the power generated from the power supplying unit 100 is charged, thereby decreasing the frequency.

In this case, the storage device may be added in the standby power unit 300. That is, in the case in which the electric automobile is added, the electric automobile may be adopted and used as the resource of the frequency adjustment only if a reference time lapses, where the reference time may be selected between four minutes and 30 minutes. Since a unit of a control time is four seconds at minimum in case of a frequency adjustment auxiliary service, it may have the predetermined time in a range of four seconds at minimum to thirty minutes at maximum and become the resource of a vehicle to grid (V2G) after the predetermined time lapses to maintain a suitable charging time in the storage device. In addition, the predetermined time may be changed and selected depending on lifespan characteristics for the respective storage devices depending on the storage device. The added storage device may participate in the frequency adjustment. The added storage device becomes the resource of the frequency adjustment after the reference time lapses, such that the suitable charging time may be maintained in the storage device. In addition, the predetermined time may be changed and selected depending on lifespan characteristics for the respective storage devices depending on the storage device.

In the operation of calculating the second SOC, the respective SOC of the storage devices constituting the standby power unit 300 is calculated.

In the operation of determining the second SOC reference, it is determined whether an absolute value obtained by subtracting a second reference value of the SOC from the SOC of the storage device calculated in the operation of calculating the second SOC exceeds a predetermined second reference. In this case, the second reference is an absolute value (|SOC−60%|) obtained by subtracting 60% from the SOC of the storage device and may be between 20% and 40%, where the second reference value may be selected between 40% and 80% and a predetermined reference may be changed by taking account of lifespan characteristics corresponding to the respective storage devices and a SOC allowable error rate of a battery management system (BMS) to the storage device.

In the operation of detaching the storage device, the storage device having the SOC of the storage device exceeding the second reference in the operation of determining the second SOC reference is detached from the system for controlling the frequency.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

DETAILED DESCRIPTION OF MAIN ELEMENTS

100: power supplying unit
200: systematic unit
300: standby power unit 310: controlling unit
400: grid unit

The invention claimed is:

1. A system for controlling a frequency, the system comprising:
   at least one power supplying unit generating power;
   at least one systematic unit consuming the power generated from the power supplying unit;
   at least one standby power unit storing the power generated from the power supplying unit and including a plurality of storage devices, wherein the at least one standby power unit includes a controlling unit, wherein the controlling unit is configured to determine whether an absolute value obtained by subtracting a first reference value of the state of charge (SOC) from the respective SOC of the storage devices is a predetermined first reference value or less, and cause the storage device having the SOC of the storage device of the first reference value or less to participate in the system for controlling the frequency; and
   at least one grid unit connecting the power supplying unit, the systematic unit, and the standby power unit to one another and controlling a frequency of power flowing to the systematic unit.

2. The system of claim 1, wherein the plurality of storage devices being discharged when a frequency supplied to the systematic unit is decreased below a predetermined value and being charged when the frequency supplied to the systematic unit is increased above the predetermined value.

3. The system of claim 1, wherein the controlling unit determining a use priority of the storage device using the state of charge (SOC) of the storage device.

4. A method for controlling a frequency by the system for controlling the frequency of claim 1, the method comprising:
   an operation of calculating a first SOC calculating the respective state of charge (SOC) of the storage devices constituting the standby power unit;
   an operation of determining a first SOC reference determining whether an absolute value obtained by subtracting a first reference value of the SOC from the SOC of the storage device calculated in the operation of calculating the first SOC is a predetermined first reference or less;
   an operation of participating a storage device participating the storage device having the SOC of the storage device of the first reference value or less in the operation of determining the first SOC reference in the system for controlling the frequency;
   an operation of determining a priority determining priorities of the storage devices participated in the operation of participating the storage device;
   an operation of requesting a frequency increase adjustment requesting the frequency increase adjustment by the systematic unit consuming the power generated from the power supplying unit;

an operation of calculating the number of participated storage devices calculating, by the standby power unit storing the power generated from the power supplying unit and including one or more storage devices, the number of storage devices necessary to perform the frequency increase requested in the operation of requesting the frequency increase adjustment;

an operation of adjusting a frequency increase increasing the frequency by applying the power stored in the storage device to the systematic unit in the case in which the storage devices as many as the necessary number calculated in the operation of calculating the storage device need to increase the frequency depending on the priority determined in the operation of determining the priority;

an operation of calculating a second SOC calculating the respective SOC of the storage devices constituting the standby power unit;

an operation of determining a second SOC reference determining whether an absolute value obtained by subtracting a second reference value of the SOC from the SOC of the storage device calculated in the operation of calculating the second SOC exceeds a predetermined second reference; and an operation of detaching a storage device detaching the storage device having the SOC of the storage device exceeding the second reference in the operation of determining the second SOC reference from the system for controlling the frequency.

5. A method for controlling a frequency by the system for controlling the frequency of claim 1, the method comprising:

an operation of calculating a first SOC calculating the respective state of charge (SOC) of the storage devices constituting the standby power unit;

an operation of determining a first SOC reference determining whether the SOC of the storage device calculated in the operation of calculating the first SOC is a predetermined first reference value or less;

an operation of participating a storage device participating the storage device having the SOC of the storage device of the first reference value or less in the operation of determining the first SOC reference in the system for controlling the frequency;

an operation of determining a priority determining priorities of the storage devices participated in the operation of participating the storage device;

an operation of requesting a frequency decrease adjustment requesting the frequency decrease adjustment by the systematic unit consuming the power generated from the power supplying unit;

an operation of calculating the number of participated storage devices calculating, by the standby power unit storing the power generated from the power supplying unit and including one or more storage devices, the number of storage devices necessary to perform the frequency decrease requested in the operation of requesting the frequency decrease adjustment;

an operation of adjusting a frequency decrease decreasing the frequency by charging the storage device with the power generated from the power supplying unit in the case in which the storage devices as many as the necessary number calculated in the operation of calculating the storage device need to decrease the frequency depending on the priority determined in the operation of determining the priority;

an operation of calculating a second SOC calculating the respective SOC of the storage devices constituting the standby power unit;

an operation of determining a second SOC reference determining whether the SOC of the storage device calculated in the operation of calculating the second SOC exceeds a predetermined second reference value; and an operation of detaching a storage device detaching the storage device having the SOC of the storage device exceeding the second reference value in the operation of determining the second SOC reference from the system for controlling the frequency.

6. The method of claim 4, wherein the first reference value is an absolute value (|SOC−first reference value|) obtained by subtracting the first reference value from the SOC of the storage device and is between 10% and 30%.

7. The method of claim 6, wherein the first reference value is between 40% and 80%.

8. The method of claim 4, wherein the second reference value is an absolute value (|SOC−second reference value|) obtained by subtracting the second reference value from the SOC of the storage device and is between 20% and 40%.

9. The method of claim 8, wherein the second reference value is between 40% and 80%.

10. The method of claim 4, wherein in the case in which the storage device is added to the standby power unit, the added storage device is performed from the operation of calculating the SOC after a predetermined reference time lapses.

11. The method of claim 10, wherein the reference time is between four seconds and thirty minutes after the storage device is added.

* * * * *